Jan. 20, 1959    F. A. WAGNER ET AL    2,869,401
GAUGE FOR BORING TOOLS
Original Filed Nov. 21, 1955
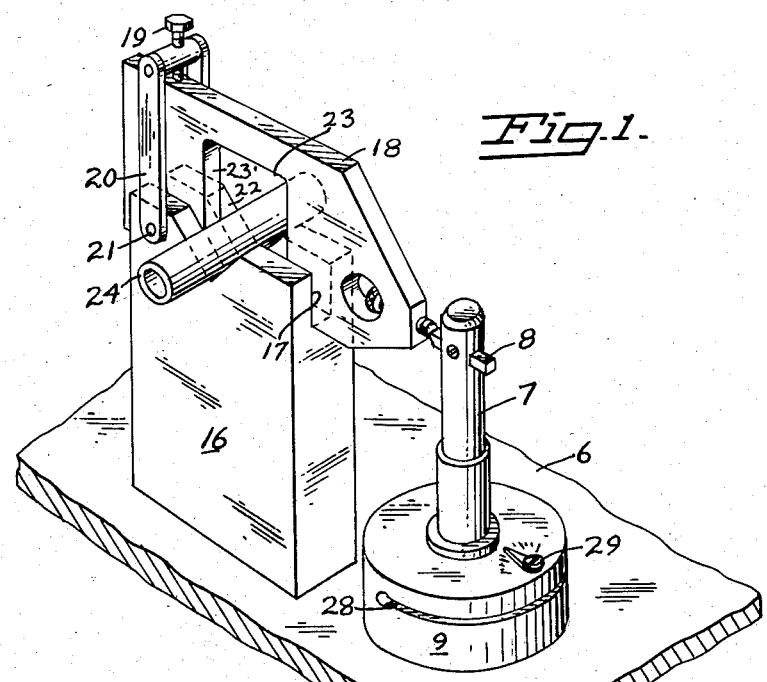
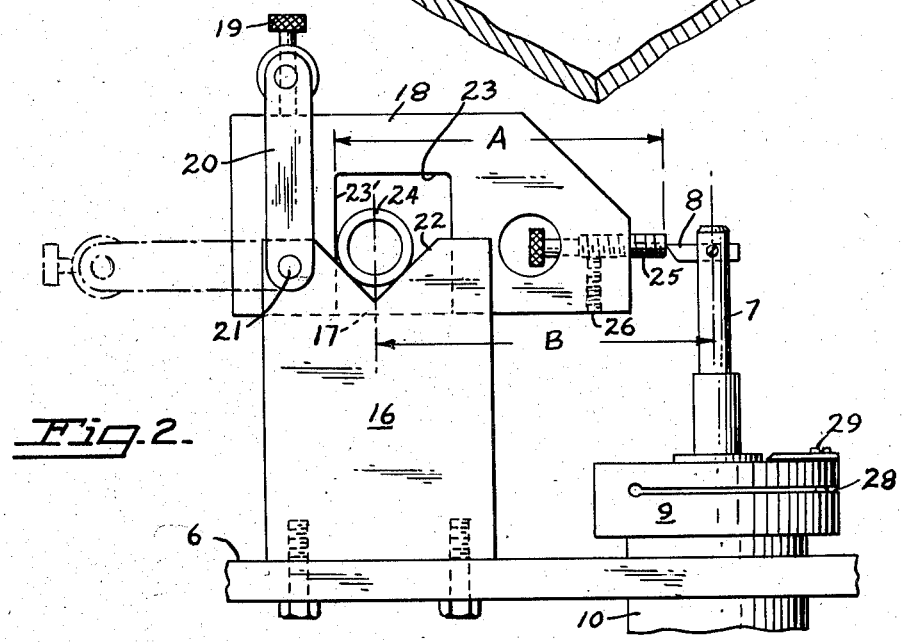
INVENTOR.
FREDERICK A. WAGNER
FRED A. WAGNER
BY
*Fryer + Johnson*
ATTORNEYS

United States Patent Office 2,869,401
Patented Jan. 20, 1959

2,869,401

GAUGE FOR BORING TOOLS

Frederick A. Wagner and Fred A. Wagner, Livermore, Calif.

Original application November 21, 1955, Serial No. 548,007. Divided and this application January 14, 1958, Serial No. 708,866

6 Claims. (Cl. 77—4)

This invention relates to gauges for boring tools and this application is a division of our co-pending application for "Engine Parts Boring Machine," Serial No. 548,007, filed November 21, 1955.

Said co-pending application discloses a machine for boring the bearings of engine parts such for example as the wrist pin bearings in engine pistons and connecting rods. It also discloses a gauge for accurately setting up a boring tool to produce a bore of a precise dimension taken from direct physical contact with a journal or shaft such as a wrist pin which is to be received in the bore cut by the tool. This gauge is the subject of the present application and, as will appear from the following description, the gauge is capable of use in various kinds of boring machines as well as that shown in the parent application.

It is the object of the present invention to provide a gauge for use with a conventional boring bar and cutting tool which, by physical contact with a shaft of a given diameter facilitates quick and accurate setting of the tool in the boring bar to cut a bore precisely the same diameter.

Further and more specific objects and advantages of the invention are made apparent in the following specification wherein reference is made to the accompanying drawing.

In the drawing:

Fig. 1 is a perspective view of a gauge for boring tools embodying the present invention, and Fig. 2 is a view in side elevation of the same.

Referring to the drawing in detail, a portion of a work surface is shown at 6 and projecting above this surface is a boring bar 7 with a boring tool 8 adjustably supported therein in a conventional manner. The boring bar is supported on the head portion 9 of a rotatable shaft 10 which is capable of being driven by power means, not shown, for imparting rotary motion to the boring tool. The device of the present invention comprises a standard 16 secured to the top of the work surface 6 and held rigidly against movement with respect thereto. The standard 16 has a slot 17 extending radially with respect to the axis of the boring bar and a plate 18 is slidably supported in the slot for movement toward and away from the cutting edge of the boring tool 8. The slidable plate 18 may be secured in any position of adjustment by a clamp screw 19 supported on a yoke 20 pivoted as at 21 to the standard 16 so that it may be swung into position over the standard as shown in full lines in Fig. 2, its position when not in use being illustrated in broken lines.

The standard 16 is provided with a V-notch 22 extending downwardly from its upper edge and at right angles to a plane which intersects the axis of the boring tool. The slidable plate 18 is provided with a gap 23 which extends upwardly through its lower edge to provide a space to straddle a shaft shown at 24 which has been positioned in the notch 22. The shaft 24 may be a wrist pin or other shaft which is to be disposed in the bore to be cut by the boring bar when the tool has been set. The sliding plate 18 is moved to the position where one edge 23' of the gap 23 is in contact with the shaft. The distance shown at A on the drawing from the edge 23' of the gap to the end of the plate 18 or any fixed extension thereof such as the screw 25 is precisely the same as the fixed distance B from the center line of the V notch to the axis of the boring bar. It is possible, of course, to make the plate 18 precisely the right length. However, the screw 25 with a flat hardened end and a set screw 26 for holding it in position is provided to enable slight adjustment of this link so that the hole to be bored can be varied in size with respect to the pin sufficiently to obtain any desired fit.

In using the gauge, the cutting tool 8 is released for adjustment in the boring bar 7. The pin or shaft for which the bearing is to be bored is placed in the V notch and the plate 18 is moved toward the boring bar until its edge 23' contacts the shaft. The plate is then locked with the screw 19, and the tool 8 is pushed toward the screw 25 until its cutting edge touches the hardened end of the screw. The cutting tool is then locked in the boring bar in this position.

When an article to be bored is lowered over the boring bar by any suitable means, examples of which are shown in the parent application herein referred to, the hole bored will be precisely the diameter of the pin or shaft 24, or this diameter may be varied as desired by adjustment of the screw 25.

Another method of adjusting the diameter may also be employed and includes a slot 28 cut in the member 9 to permit slight warping of its upper surface and consequent tilting of the boring bar in either one of two directions to effectively lengthen or shorten the cutting tool 8. This adjusted tilt of the boring bar is fixed as by a set screw 29 which passes through the slot 28 to engage the lower portion of the member 9 all as described in the parent application.

With the present invention, the use of calipers or micrometers is eliminated in setting of a boring bar to provide a hole or bore of a given diameter and this setting is accomplished by direct physical reference to the shaft for which the hole is to be bored.

We claim:

1. A gauge for setting a boring tool in a boring bar to cut a diameter to fit a given shaft which comprises, a member with a V notch having the apex of the V a distance from the axis of the boring bar and adapted to receive the shaft, a gauge plate with two edges spaced the same distance, one edge for contact with the shaft while the other edge acts as a stop for the cutting end of the boring tool to be set.

2. A gauge for setting a boring tool in a boring bar to cut a diameter to fit a given shaft which comprises, a member with a V notch having the apex of the V a distance from the axis of the boring bar and adapted to receive the shaft, a gauge plate with two edges spaced the same distance, one edge for contact with the shaft while the other edge acts as a stop for the cutting end of the boring tool to be set, and means to clamp the gauge plate to the member with the V notch.

3. A gauge for setting a boring tool in a boring bar to cut a diameter to fit a given shaft which comprises, a member with a V notch having the apex of the V a distance from the axis of the boring bar and adapted to receive the shaft, a guide groove on said member intersecting the V notch and disposed radially with respect to the boring bar, a gauge plate slidable in said groove toward and away from the boring bar, and separate edges on said gauge plate spaced the same distance for engagement one with the shaft in the V notch and the other with the cutting end of the boring tool.

4. In a boring machine having an extending boring bar with a boring tool adjustably projecting laterally therefrom, means for setting the cutting edge of the tool directly from transferred contact with the shaft for the hole to be bored, and which comprises a shaft receiving V notch block mounted on the machine in fixed relation to the boring bar so that various sizes of shafts or round pins may be respectively placed in the V block so that their axes will all measure the same distance to the axis of the boring bar, and a radially movable rigid gauge member provided with a portion to contact that side of the shaft remote from the boring tool and a portion to simultaneously contact the cutting edge of the tool when set, the two portions being normally spaced apart exactly the same distance as the fixed distance from the center line of the V block to the center line of the boring bar.

5. In a boring machine having an extending boring bar with a boring tool adjustably projecting laterally therefrom, means for setting the cutting edge of the tool directly from transferred contact with the shaft for the hole to be bored, and which comprises a shaft receiving V notch block mounted on the machine in fixed relation to the boring bar so that various sizes of shafts or round pins may be respectively placed in the V block so that their axes will all measure the same distance to the axis of the boring bar, and a radially movable rigid gauge member provided with a portion to contact that side of the shaft remote from the boring tool, and a portion to simultaneously contact the cutting edge of the tool when set, the two portions being normally spaced apart exactly the same distance as the fixed distance from the center line of the V block to the center line of the boring bar, and means for micrometrically varying the effective length of said gauge member for boring plus or minus diameter holes, and means for locking said gauge member in position.

6. In a boring machine having an extending boring bar with a boring tool adjustably projecting laterally therefrom, means for setting the cutting edge of the tool directly from transferred contact with the shaft for the hole to be bored, and which comprises a shaft receiving V notch block mounted on the machine in fixed relation to the boring bar so that various sizes of shafts or round pins may be respectively placed in the V block so that their axes will all measure the same distance to the axis of the boring bar, and a radially movable rigid gauge member provided with a portion to contact that side of the shaft remote from the boring tool and a portion to simultaneously contact the cutting edge of the tool when set, the two portions being normally spaced apart exactly the same distance as the fixed distance from the center line of the V block to the center line of the boring bar, said gauge member being a flat yoke slidably mounted in a slot crossing transversely through the V notch of the block in straddling relation to a shaft in the notch.

No references cited.